(12) United States Patent
Fanini et al.

(10) Patent No.: US 9,664,815 B2
(45) Date of Patent: May 30, 2017

(54) TELEMETRY METHOD AND SYSTEM FOR SUBSURFACE WELL AND RESERVOIR AND LOGGING DATA

(75) Inventors: Otto N. Fanini, Houston, TX (US); Raman Viswanathan, Houston, TX (US); Jorge Omar Maxit, Houston, TX (US); Harold Andrade, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 1499 days.

(21) Appl. No.: 12/237,559

(22) Filed: Sep. 25, 2008

(65) Prior Publication Data

US 2010/0073190 A1   Mar. 25, 2010

(51) Int. Cl.
*G01V 11/00*  (2006.01)
*E21B 47/12*  (2012.01)

(52) U.S. Cl.
CPC ............ *G01V 11/002* (2013.01); *E21B 47/12* (2013.01)

(58) Field of Classification Search
CPC ...... E21B 47/12; E21B 47/122; E21B 17/003; G01V 11/002
USPC ........ 166/250.01, 65.1, 66; 340/853.2, 855.7
See application file for complete search history.

(56) References Cited

U.S. PATENT DOCUMENTS

| | | |
|---|---|---|
| 5,387,907 A | 2/1995 | Gardner et al. |
| 5,473,321 A | 12/1995 | Goodman et al. |
| 5,504,479 A | 4/1996 | Doyle et al. |
| 6,657,551 B2 * | 12/2003 | Huckaba ............ G01V 11/002 340/853.2 |
| 6,816,082 B1 * | 11/2004 | Laborde .................. E21B 47/12 340/853.2 |

(Continued)

FOREIGN PATENT DOCUMENTS

WO    0149001 A1    7/2001

OTHER PUBLICATIONS

Barry, John R.; Lee, Edward, A. and Messerchmitt, David G., Pulse-Amplitude Modulation: Minimum-Distance Sequence Detection, Digital Communication, 2004, pp. 164-184, 3rd. ed., Springer, New York.

(Continued)

*Primary Examiner* — Elizabeth Gitlin
(74) *Attorney, Agent, or Firm* — Bracewell LLP; Keith R. Derrington

(57) ABSTRACT

A method and system for transmitting data through a transmission medium in a wellbore. A surface transceiver and a subsurface transceiver are each configured to selectively transmit over a plurality of transmission channels. The surface transceiver is adapted to initialize a channel to determine at least one parameter affecting the current maximum data rate for transmission of information through the channel using a given transmission methodology. At least one of the channels uses carrierless phase/amplitude (CAP) modulation for its transmission methodology. The surface transceiver and the subsurface transceiver adapt to cooperatively periodically test a channel by transmission of a calibration signal from the subsurface transceiver to the surface transceiver. Control circuitry compares the received calibration signal with the calibration signal, responding to the result of the comparison to adjust at least one parameter as necessary to achieve an optimum rate of data transmission through said channel.

15 Claims, 9 Drawing Sheets

(56) References Cited

U.S. PATENT DOCUMENTS

| | | |
|---|---|---|
| 7,042,367 B2 | 5/2006 | Gardner et al. |
| 2005/0285753 A1* | 12/2005 | Shah ................ E21B 47/12 340/854.9 |
| 2008/0218375 A1* | 9/2008 | Viswanathan et al. .... 340/854.9 |

OTHER PUBLICATIONS

Bracewell, Ronald N., The Fourier Transform and Its Applications, pp. 267-272, McGraw-Hill, Boston.

Champeney, D.C., A Handbook of Fourier Theorems, 1987, pp. 78-80, Cambridge University Press, Great Britain.

Couch, Leon W. II, Digital and Analog Communication Systems, 2001, pp. 233-237; 312-318; 431-444; 645 and 712-715.

Ditkin, V.A. and Prudnikov, A.P., Integral Transforms and Operational Calculus, International Series of Monographs in Pure and Applied Mathematics, 1965, pp. 85-87 and 505-507, vol. 78, Pergamon Press, London.

Frerking, Marvin E., Processing Complex Signals, Digital Signal Processing in Communication Systems, 1994, pp. 113-151, Van Nostrand Reinhold, New York.

Frerking, Marvin E., Digital Algorithims for Communication Systems, Digital Signal Processing in Communication Systems, 1994, pp. 212-304, Van Nostrand Reinhold, New York.

Oppenheim, Alan V. and Schafer, Ronald W., Discrete-Time Signal Processing, 1989, pp. 45-62, Prentice Hall.

Oppenheim, Alan V. and Schafer, Ronald W., Discrete-Time Signal Processing, 1989, pp. 514-580, Prentice Hall.

Oppenheim, Alan V. and Schafer, Ronald W., Discrete-Time Signal Processing, 1989, pp. 782-785, Prentice Hall.

Papoulis, Athanasios, Signal Analysis, 1977, pp. 166-224, McGraw-Hill Book Company.

Skylar, Bernard, Digital Communications, Fundamentals and Applications, 2001, pp. 1-19, 2nd ed., Prentice Hall, Upper Saddle River.

Skylar, Bernard, Digital Communications, Fundamentals and Applications, 2001, pp. 167-241, 2nd ed., Prentice Hall, Upper Saddle River.

Skylar, Bernard, Digital Communications, Fundamentals and Applications, 2001, pp. 304-380, 2nd ed., Prentice Hall, Upper Saddle River.

Skylar, Bernard, Digital Communications, Fundamentals and Applications, 2001, pp. 381-435, 2nd ed., Prentice Hall, Upper Saddle River.

Skylar, Bernard, Digital Communications, Fundamentals and Applications, 2001, pp. 436-519, 2nd ed., Prentice Hall, Upper Saddle River.

Sobrara, M.; Werner, J.J. and Zervos, N.A.; Carrierless AM/PM, 1990, pp. 1-24.

* cited by examiner

TELEMETRY METHOD AND SYSTEM FOR SUBSURFACE WELL AND RESERVOIR AND LOGGING DATA

FIELD OF THE INVENTION

The present invention relates generally to hydrocarbon exploration and production, and more particularly relates to a method and system for subsurface to surface data transmission.

BACKGROUND OF THE INVENTION

The present invention is related to the field of subsurface to surface data transmission involving reservoir management, electric wireline well logging tools, and other subsurface logging devices. More specifically, the present invention is related to systems for communicating data signals (e.g., logging data) from locations disposed deep within wellbores to a surface-based transceiver, such as a recording system or a relay repeater (wireless or other transmission means) located at the earth's surface.

Those of ordinary skill in the art will be quite familiar with the use of electric wireline well logging tools, which are used to make measurements of certain properties of earth formations penetrated by wellbores. The measurements can assist the wellbore operator in determining the presence, and quantity if present, of oil and gas within subterranean reservoirs located within the earth formations. Well logging tools known in the art are typically extended into the wellbore at one end of an armored electrical cable. The cable can include at least one, and commonly includes as many as seven, insulated electrical conductors surrounded by steel armor wires. The armor wires are included to provide abrasion resistance and tensile strength to the cable. The cable supplies electrical power to the logging tools and provides communication channels for signals sent between a transceiver located in the proximity of the logging tools and another transceiver usually located near the wellbore at the earth's surface.

Logging tools known in the art can provide many different types of measurements of earth formation properties, including measurements of electrical resistivity, natural gamma-ray radiation intensity, bulk density, hydrogen nucleus concentration and acoustic travel time, among countless others. Another class of logging tools, generally called "imaging" tools, provide finely detailed measurements, meaning successive measurements can be made at axial and radial spacings of as little as several hundredths of an inch, of resistivity and acoustic pulse-echo travel time in order to generate a graphic representation of the wall of the wellbore, or of one or more physical parameters of the rock.

It is known in the art to digitize analog well logging measurement data. This involves converting the analog output signals from each logging tool into a stream or sequence of binary digital values composed of "words" comprised of a plurality of digital bits, bits being signal levels representing numerical (binary) "ones" and "zeroes". For example, digital words can represent the numerical values of the measurements sampled at spaced apart time intervals. The measurements are then typically transmitted to the surface transceiver as a series of digital bits arranged in a predetermined pattern. The significance of the predetermined pattern will be further explained.

It is generally beneficial to the wellbore operator to be able to combine as many different types of logging tools as is practical into one continuous instrument package (generally called a "tool string"). The benefit to the operator is the reduction of the number of times logging tools must be extended into the wellbore, likely saving a considerable amount of operating time. Combining a large number of measurements generally requires that large amounts of data be sent to the surface.

A particular problem in combining large numbers of measurements in the tool string is that the large amount of signal data to be transmitted can cause the required quantity of signal data per unit of time (e.g., bits per second) to exceed the signal carrying capacity (bandwidth) of the transmission medium, such as a cable. This problem is particularly acute when imaging tools are included in a tool string because of the very fine measurement both in time and space, and consequently the large increase in the amount of signal data, of imaging tools relative to other types of tools.

The cable—indeed, any transmission medium—may have limited signal transmission capacity for any of a number of reasons, some controllable, some not. For example, there may be a restriction on the external diameter of a cable for reasons related to safety of the wellbore and personnel near the wellbore. A practical limit for the diameter of seven conductor cables known in the art can be about $19/32$ of an inch. Limited cable diameter provides cables generally having electrical properties which limit their frequency response to less than about 200,000 Hz (200 kHz). The frequency response of a cable is limited, and cables typically exhibit a "transfer function" roll-off at higher frequencies, as would be understood by those of ordinary skill.

It is known in the art to increase the effective signal data carrying capacity of a logging cable by encoding the binary digital signals using various types of encoding methods. The encoding methods constitute the previously described "predetermined pattern" of digital bits. Quadrature amplitude modulation ("QAM") telemetry can be used to transmit well logging data to the recording system, and one type of QAM telemetry system used for well logging tools is described, for example, in U.S. Pat. No. 5,387,907 issued to Gardner et al. QAM telemetry includes conversion of groups of digital bits ("bit groups") in the previously described predetermined pattern into two-dimensional symbols, each comprising coordinates corresponding to the bit values in each bit group. The coordinates are converted to in-phase and quadrature analog signal amplitudes which are used to drive a specialized analog signal modulator. The modulator controls the output amplitude of a signal carrier generator. The modulated carrier is applied to the logging cable. Signal data are recovered in the recording system by extracting the amplitude values from the modulated carrier and reconverting them to digital bits.

A drawback to QAM when used in wireline well logging tool signal telemetry is that precise recovery of the data signal impressed onto the carrier requires a complex and expensive signal demodulator to precisely recover the amplitude and phase of the carrier.

Clark et al. (2001 publication—Schlumberger WO 01/49001 A1) applies to the downhole environment discrete multi-tone modulation (DMT) techniques used in asymmetric digital subscriber line (ADSL) applications commonly used in surface telephony and the like. With ADSL techniques it is possible to accomplish a large data throughput of several million bits per second on a standard twisted-pair telephone line. Each tone is used as a separate carrier. The amount of bits transmitted per each carrier per unit time increases with higher signal to noise ratio detected in the transmission of each carrier. This application has a perceived drawback of wasting the transmission media's power dynamic range available with carrier energy which effectively does not transmit any data.

Those of ordinary skill in the art will appreciate that Directional Drilling Systems (DDS), Measurement While Drilling (MWD), Logging While Drilling (LWD), Electric Wireline Well Logging (EWL), and permanent and semi-permanent subsurface devices (PS) are respectively employed during the drilling, post drilling and production phases of oil and gas well developments. These devices are employed to assist the wellbore operator in determination of the direction of the wellbore while drilling, properties of the earth formations, both while drilling and shortly thereafter, and still later in determining or controlling important production characteristics when the well is placed into production. In all these applications there is a need to communicate between the subsurface and surface devices as well as between the subsurface devices in the wellbore.

The medium for communication between the devices will vary depending on the application. Electrical conductors or optical signals may be used for EWL or PS, while acoustic, hydraulic pressure or flow pulses or electromagnetic energy may alternatively be used for MWD or LWD, and furthermore, electromagnetic waves for DDS applications, for example. Each of these will have a widely varying transmission bandwidth and each application will have a theoretical maximum data transmission speed based on bandwidth and signal-to-noise characteristics allowed by the transmission medium, according to Shannon's formula.

Many of the associated methods disclosed for improving subsurface to surface communications speed in oil and gas exploration business have been directed toward conventional EWL cable, and there have been adaptations of methods that were earlier disclosed for use in telecommunication applications. Some of the more recent methods disclosed include: adaptive filtering, Quadrature Modulation (QAM), discrete Multi-tone (DMT) and carrier-less amplitude and phase (CAP) methodologies.

U.S. Pat. No. 5,473,321 to Goodman et al. teaches the use of an adaptive communication system for transmitting data on conventional EWL cable. The method employs transmitting a periodic pseudo-random training sequence to effectively initialize and optimize an adaptive filter equalizer to improve communication between a surface device and subsurface logging instrument. The subsurface instrument transmits a predetermined training signal to the surface device until the surface receiver has acclimated itself to the transmission characteristics of the EWL cable by adaptively configuring the filter-equalizer, thereby enabling the surface receiver to more accurately interpret the data received, reducing the effects of the signal attenuation, noise, or other distortions.

U.S. Pat. No. 5,387,907 to Gardner et al. discloses a QAM method for increasing the data transmission capability of a conventional EWL cable. QAM employs transceivers that modulate and demodulate the amplitude of sine and cosine carrier signals to encode transmitted data.

WO 01/49001 to Clark et al. discloses a DMT method for increasing the data transmission capability of a conventional EWL cable. DMT is an extension of QAM, as it is a multi-carrier QAM transceiver implementation. The transmission bandwidth of the EWL is divided into multiple carrier frequencies, each transmitting QAM encoded data. The amount of data placed onto a particular carrier frequency can be adjusted or even made zero if an unacceptable level of noise is encountered at that frequency. Reception of the acquired data is similar to the transmission and involves a reciprocal demodulation method. The DMT multi-carrier method enables increased data transmission and an improvement in flexibility when coping with noise, compared to single-carrier frequency QAM.

U.S. Pat. No. 5,504,479 to Doyle et al., incorporated herein by reference, discloses a CAP method for increasing the data transmission capability of a conventional EWL cable. CAP is similar to QAM in that it employs phase and amplitude modulated orthogonal signals to encode and decode data. CAP, as used for the telecommunications market, is described, for example, in "Contribution T1E1.4/90-154, Carrier less AM/PM", by Sobrara et al., presented to American National Standards Institute (ANSI) T1E1.4 Technical Subcommittee Working Group, 1990, where it also illustrates the QAM may be derived as a subset of CAP. Because CAP does not employ a carrier signal, is not subject to performance degradation due to errors in recovering the carrier (and does not use power to transmit a carrier); nor does CAP require a complex and expensive demodulator. CAP also lends itself to a digital implementation, as known in the art. Establishing a high speed communication modulation standard for the internet, for example, has led to a significant competitive debate particularly between the proponents of the front-runner methods of DMT and CAP. Each technology has demonstrated operational success bringing certain advantages as mentioned, but as presently defined within the telecommunications industry, the two methods are significantly different and not compatible.

Unlike the telecommunications market, the issue of compatibility is relatively insignificant for the communication applications described herein, since the transmission is typically between devices of a proprietary nature, where both ends of the communications means are controlled by the same user. In the event communication with a third party device is desired, a communication bridge between the devices could be formed using a common protocol such as Ethernet, for example. Also, unlike the telecommunications market, the cost of the communication device is of only minor concern. For example, if the communication method required several additional components, such as DSP's (digital signal processors), the incremental cost would be a minor fraction of the cost of the combined investment in the communication and associated devices employed. By far, the robustness of the communication, the potential value of an increased data rate and the capability to operate in the adverse subsurface environment are the far more important objectives.

A perceived drawback to CAP systems such as proposed in the Sobrara et al. reference is—that the system is best suited for telecommunications applications (e.g., a public telephone network), rather than for well logging applications. The system described in the Sobrara et al. reference can have inadequate ability to compensate for changes in signal timing that can particularly occur in wireline signal telemetry because of changes in electrical signal transmission properties of the cable and in signal timing generator changes in the well logging tools. Timing generator changes in the tools and electrical property changes in the cable can result from variation in the ambient temperature of the cable and the electronics in the well logging tools, as they are extended into and withdrawn from the wellbore. CAP telemetry system for use in wireline well logging which can compensate for timing generator changes and electrical transmission property changes in the logging cable.

These perceived shortcomings were addressed in U.S. Pat. No. 5,504,479 to Doyle et al., entitled "Carrierless Amplitude and Phase Modulation Telemetry for Use in Electric Wireline Well Logging". The Doyle et al. '479 patent is hereby incorporated by reference herein in its entirety. This telemetry system proposed in Doyle et al. was devised for use in wireline well logging which can compensate for timing generator changes and electrical transmission property changes in the logging cable. A possible disadvantage of this method is the vulnerability of a single channel operation. If this channel becomes corrupted by noise the entire telemetry system is shut down.

Further background is included in the following references and incorporated herein by reference: "Contribution T1E1.4/90-154, Carrierless AM/PM", by Sobrara et al, as presented to American National Standards Institute (ANSI) T1E1.4 Technical Subcommittee Working Group, 1990; Bracewell, R., "The Fourier Transform and Its Applications", 3rd ed., New York: McGraw-Hill, pp. 267-272, 1999; and "Digital Communication", third edition, Springer, Section 5.4, pp. 164-184, 2004.

SUMMARY OF THE INVENTION

In view of the foregoing and other considerations, the present invention relates to an adaptable multi-channel signal modulation for two-way communication between subsurface devices and between surface and subsurface devices employed during various phases of oil and gas exploration to improve communication reliability and communication speed.

A system and method in accordance with one embodiment of the present invention is provided to achieve an improved modulating method for the applications described herein that combines the noise coping capability of the DMT-like method, the digital implementation capability of a CAP-like method with additional novel characteristics advantageous to the targeted applications.

In accordance with one aspect of the invention, for any particular transmission medium, the total available bandwidth is determined and partitioned into an appropriate number of channels, with each channel being defined by upper and lower frequency limits. In one embodiment, the invention provides signal modulation and data encoding and decoding that may be different and optimized separately for each transmission channel.

In accordance with another aspect of the invention, there is provided a more capable and flexible data transmission method utilizing multiple channels for data transmission, in which the channels each continuously adapt to the media transmission conditions, after an initialization procedure. Transmission efficiency is gained as certain ranges of the media's frequency spectrum allow for faster transmission rates and are thus properly exploited and, conversely, ranges of the transmission spectrum which exhibit poor transmission conditions are avoided. Periodically, each channel's data rate utilization, compensation and correction factors and the like are updated based on the media's characteristics at each channel.

In a preferred embodiment of the invention, based on continuous monitoring of the transmission quality of a channel, the data signal-to-noise ratio and transmission speed is dynamically optimized by monitoring defined error signals and controlling transceiver parameters, such as (without limitation): the number of channels in the bandwidth, the channel widths (upper and lower frequency limits), the characteristics of the modulation in each channel, signal energy in each channel, bit and symbol load on each channel, the method of encoding and decoding and the error correction methods on each channel. An appropriate protocol is established for initialization of these and other parameters and also for addressing the potential loss of synchronization between transceivers during periods when there is no "operational" data transmission.

The transmitted signal may be in the form of acoustic energy, electric, magnetic and/or electromagnetic energy, depending on the medium's transmission properties and other application-dependent parameters. In one embodiment, the medium may be a cable having one or more conductors. In other embodiments the communication may be wireless. In one wireless embodiment, the medium may be the fluid in the borehole where the signal is created by a pressure pulse (acoustic pulse) in the fluid with a typical transmission bandwidth ranging from <1 to 10 Hz. In another wireless embodiment, the transmission medium may be the earth/fluid surrounding the well bore where the signal may be electric, magnetic or electromagnetic energy depending on the desired communication distance and the physical (electrical and magnetic) properties of the earth/fluid medium. Bandwidth may range from less than 1 Hz to many tens of kilohertz (e.g., on the order of 1 GHz) depending upon the wide variations in the parameters encountered. In still another wireless embodiment, the signal may be light through an optically translucent medium, such as through an optical fiber, optical window or optically translucent fluid.

In practice, a communication medium may be created by any means that will support the application and detection of the modulation and encoding and decoding method disclosed in the invention, for example, modulating and detecting temperature, flow velocity, radioactivity, and so on.

BRIEF DESCRIPTION OF THE DRAWINGS

The foregoing and other features and aspects of the present invention will be best appreciated by reference to a detailed description of the specific embodiments of the invention, when read in conjunction with the accompanying drawings, wherein.

DETAILED DESCRIPTION OF A SPECIFIC EMBODIMENT OF THE INVENTION

In the disclosure that follows, in the interest of clarity, not all features of actual implementations are described. It will of course be appreciated that in the development of any such actual implementation, as in any such project, numerous engineering and technical decisions and selections must be made to achieve specific goals, while operating within the various known constraints that may be posed, which will vary from one implementation to another. Moreover, it is necessary to adhere to proper engineering and development practices for the environment in question. It will be appreciated that such development efforts might be complex and time-consuming, but would nevertheless be a routine undertaking for those of ordinary skill in the relevant fields.

One implementation of this invention method is described below. As noted above, the invention is directed to the use of a transmission medium having a limited frequency bandwidth. In accordance with one aspect of the invention, this total bandwidth is subdivided into a plurality of separate, non-overlapping frequency ranges, referred herein as channels.

In a presently preferred embodiment, a first step in practicing the invention is the initialization and conditioning of each channel. The multiple communication channels would be initialized through a predetermined initialization sequence, one example of which being depicted in FIG. 1.

Figure 1:
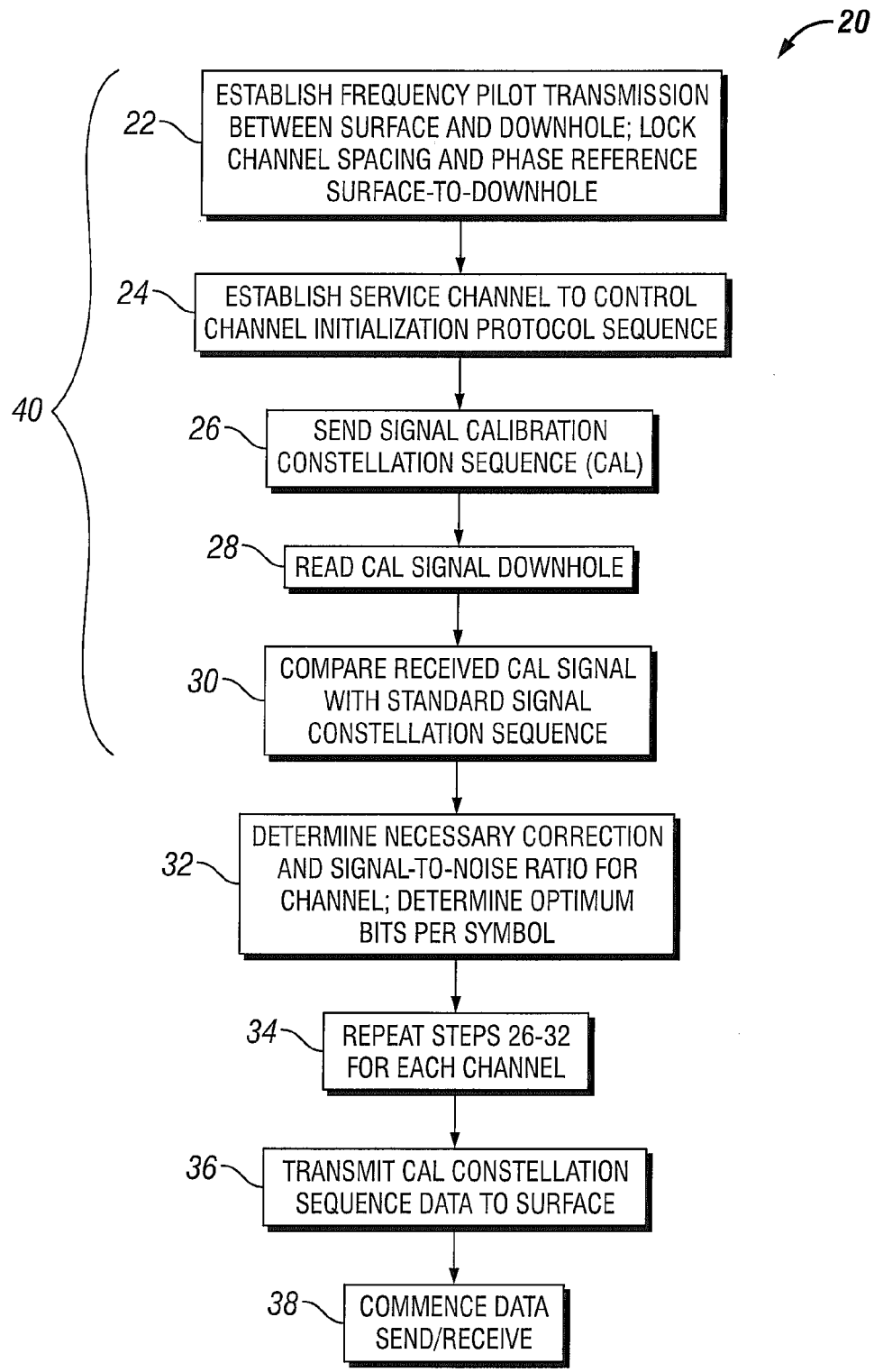
FIG. 1 is block diagram specifying the steps involved in an initialization/calibration process for a telemetry system, performed in accordance with one embodiment of the invention.

As shown in FIG. 1, a channel initialization sequence 20 in accordance with one embodiment begins at block 22 by establishing a pilot transmission frequency between the surface and downhole, and locking in channel spacing and phase reference between surface and downhole.

Next, at block 24, a service channel to control channel initialization protocol sequence is established. This defines which channels are to be used for payload service (i.e., transmission of data) and which are reserved for relaying control information between the surface and downhole.

In block 26, the surface transmitter (not shown) transmits a calibration constellation sequence (CAL sequence) to the downhole receiver. The CAL sequence is read by the downhole receiver, as shown by block 28.

The downhole receiver then compares the received CAL sequence with a predetermined standard signal constellation sequence to detect any differences, at block 30.

Based upon the comparison in block 30, the system is able to determine any necessary correction factors to account for signal variation occurring during surface-to-downhole transmission. The signal-to-noise (SNR) ratio can also be calculated, all as represented by block 32 in FIG. 1.

As represented by block 34, the entire process of steps 26-32 is repeated for each transmission channel. Thereafter, a calibration constellation sequence is transmitted on each channel to the surface, to complete the channel initialization process, as represented by block 36. Thereafter, at block 38, data send/receive operation can commence, as shall hereinafter be described in further detail.

In one example, a system uses control circuitry to execute the methods described herein. In a further example, the control circuitry includes a combination of hardware, firmware, and/or software.

Figure 3:
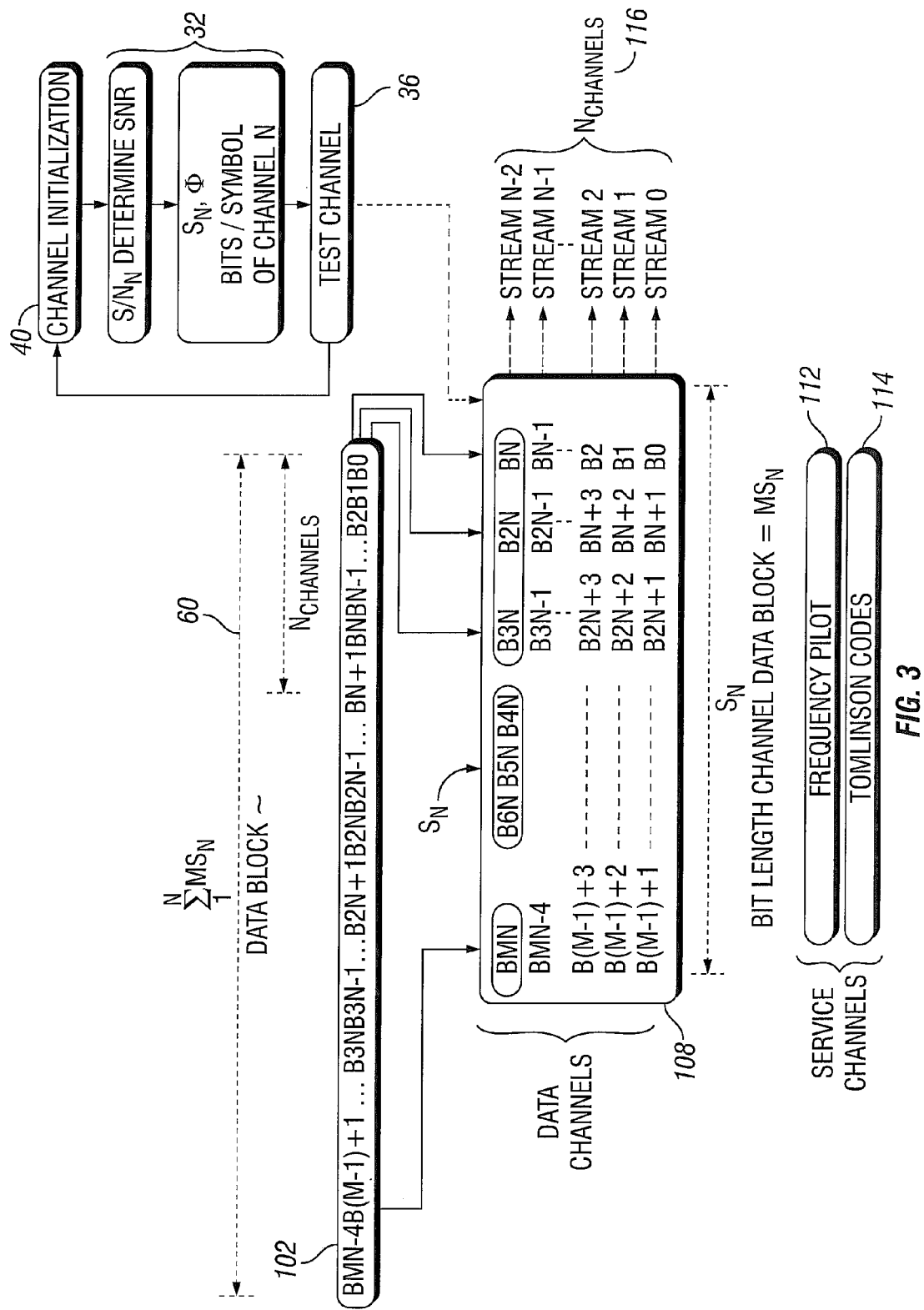
FIG. 3 is a functional block diagram of a process for conversion of a bit stream data block into a symbol stream and of the data and service channels defined as a result of such conversion, in accordance with one embodiment of the invention.

The steps 22 through 30 in FIG. 1 are collectively represented by block 40 in the functional diagram of FIG. 3, followed by the determination of the SNR ratio and determination of optimum bits per symbol (block 32) and the channel testing (block 36), each also shown in FIG. 3.

Figure 6:
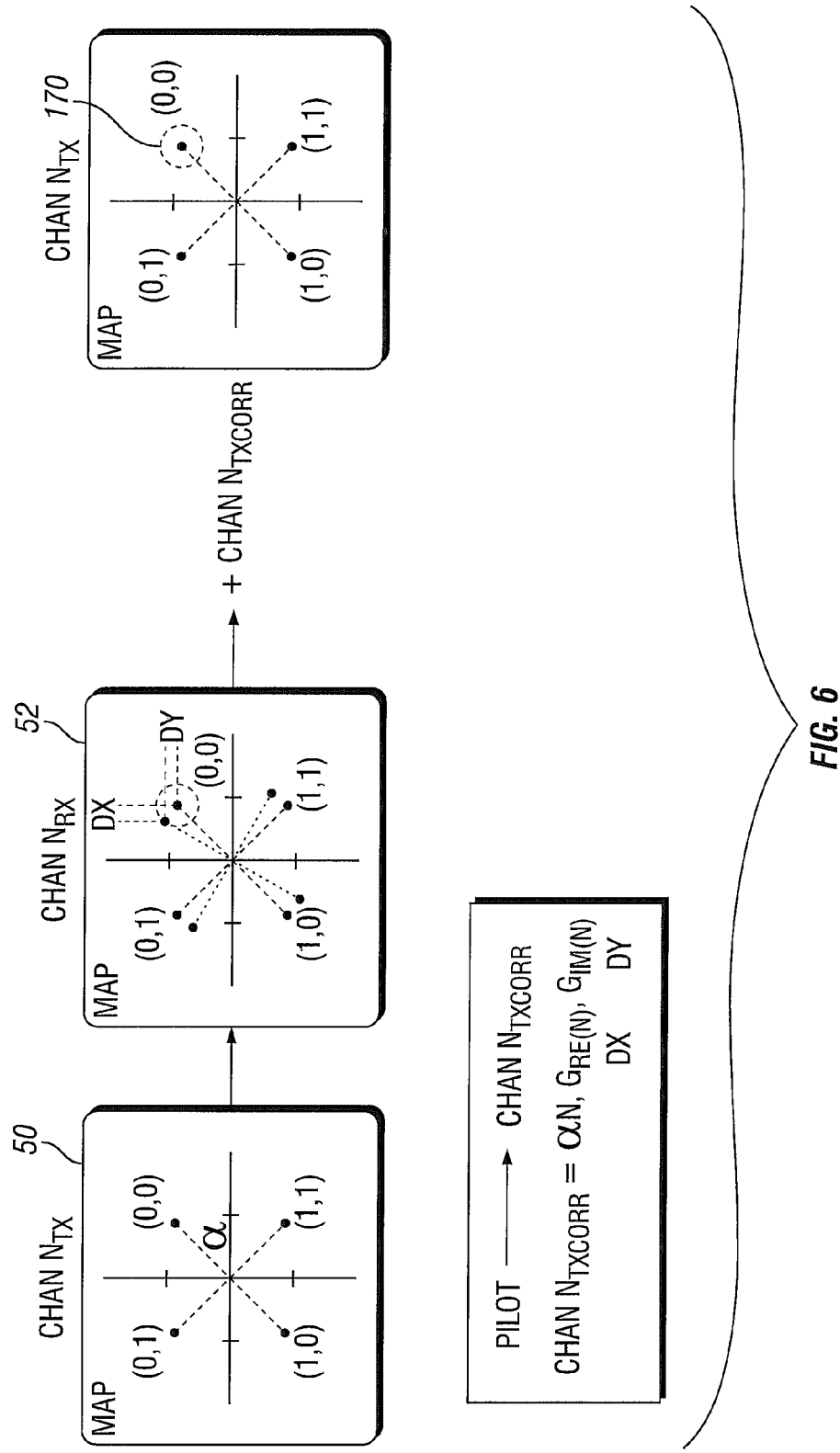
FIG. 6 is a functional block diagram of a process for received constellation error calibration/correction.

FIG. 6 illustrates graphically the process 20 of FIG. 1, showing first a signal calibration constellation sequence 50, (with two bits per symbol as an exemplary embodiment) as transmitted at step 26 in FIG. 1. Reference numeral 52 shows the CAL sequence as received by the downhole receiver, and reveals an error factor (dx, dy) introduced during the surface to downhole transmission. This enables the system to compute a phase and amplitude calibration factor (pilot) for the channel ($N_{TXCorr}$), where for channel N, Chan $N_{TXCorr} = \alpha N$, dx, dy.

Figure 2:
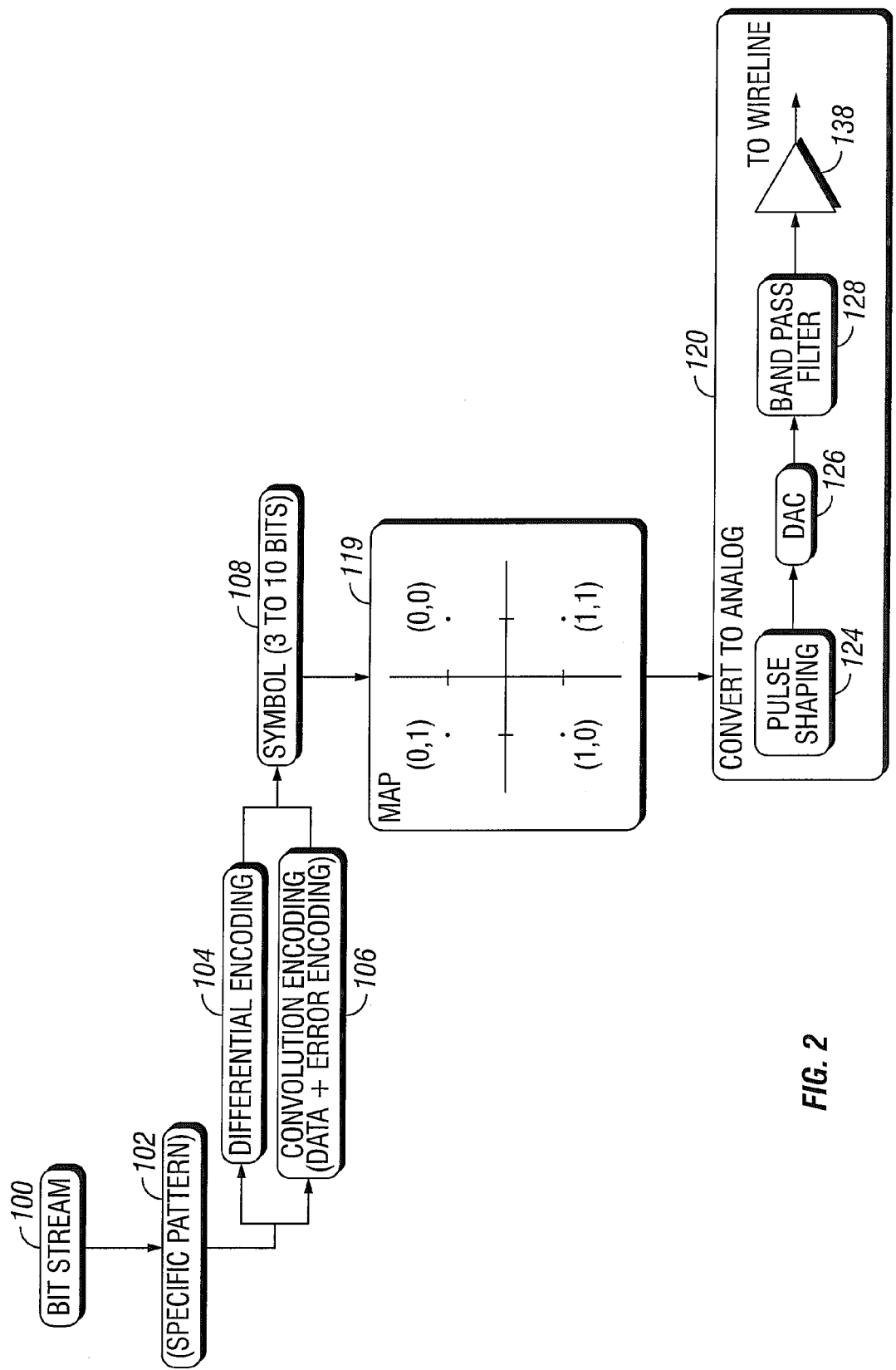
FIG. 2 is a functional block diagram illustrating a transmission channel processing sequence in accordance with one embodiment of the invention.

Following the channel initialization process, the methodology in accordance to the presently disclosed embodiment proceeds in accordance with a methodology outlined generally in the highly simplified functional block diagram of FIG. 2.

Referring to FIG. 2, first a bit stream 100 is presented, such as from a downhole analytical or measurement instrument of some sort, as would be familiar to those of ordinary skill in the art. In one embodiment, the bit stream 100 is reorganized into a predetermined specific pattern (block 102 in FIG. 2), prior to being subjected to differential encoding (block 104) and convolution encoding (block 106), yielding a data block comprising an ordered sequence of bits formed in accordance with an appropriate predetermined protocol.

FIG. 2 shows how a bit stream 100 is first organized in a predetermined pattern (block 102) to create a multi-channel data block. In particular, a bit stream 100 is organized into a pattern in a buffer 102, such pattern in the exemplary embodiment having the following form, as shown in FIG. 3:

$$BMN, B(M-1)+1 \ldots B3N, B3N-1 \ldots B2N+1, B2N,$$
$$B2N-1 \ldots BN+1, BN, BN-1 \ldots B2, B1, B0$$

With reference to FIG. 2, the bit stream pattern is then subjected to differential encoding and convolution encoding (blocks 104 and 106 in FIG. 2) prior to being further reorganized into a multi-channel data block 108 (shown in FIG. 3), based on a predefined bit-to-channel routing sequence. It is to be understood that the particular transformation of FIGS. 2 and 3 is merely exemplary, and those of ordinary skill in the art will recognize that many other bit-to-channel routing schemes may be employed instead of that in the presently disclosed embodiment. Furthermore, in one embodiment, the bits in the input stream data block 108 may be scrambled to randomly produce a multi-channel frequency spectrum, which exhibits a more uniform energy density per unit frequency, as would be recognized by those of ordinary skill in the art.

Multi-channel data block 108 in accordance with the specific implementation of the presently disclosed embodiment is shown in FIG. 3, wherein it is apparent that the data block 108 is readily divided into a plurality of bit streams. In the example of FIG. 3, the data block is separable into N−2 separate bit streams, (where N is the total number of channels available in the system). The remaining channels, in this case two, are dedicated service channels 112 and 114, although those of ordinary skill having the benefit of the present disclosure will recognize that the invention may be implemented using more or fewer service channels. Thus, a total of N streams collectively identified with reference numeral 116 in FIG. 3, are generated.

Figure 4:
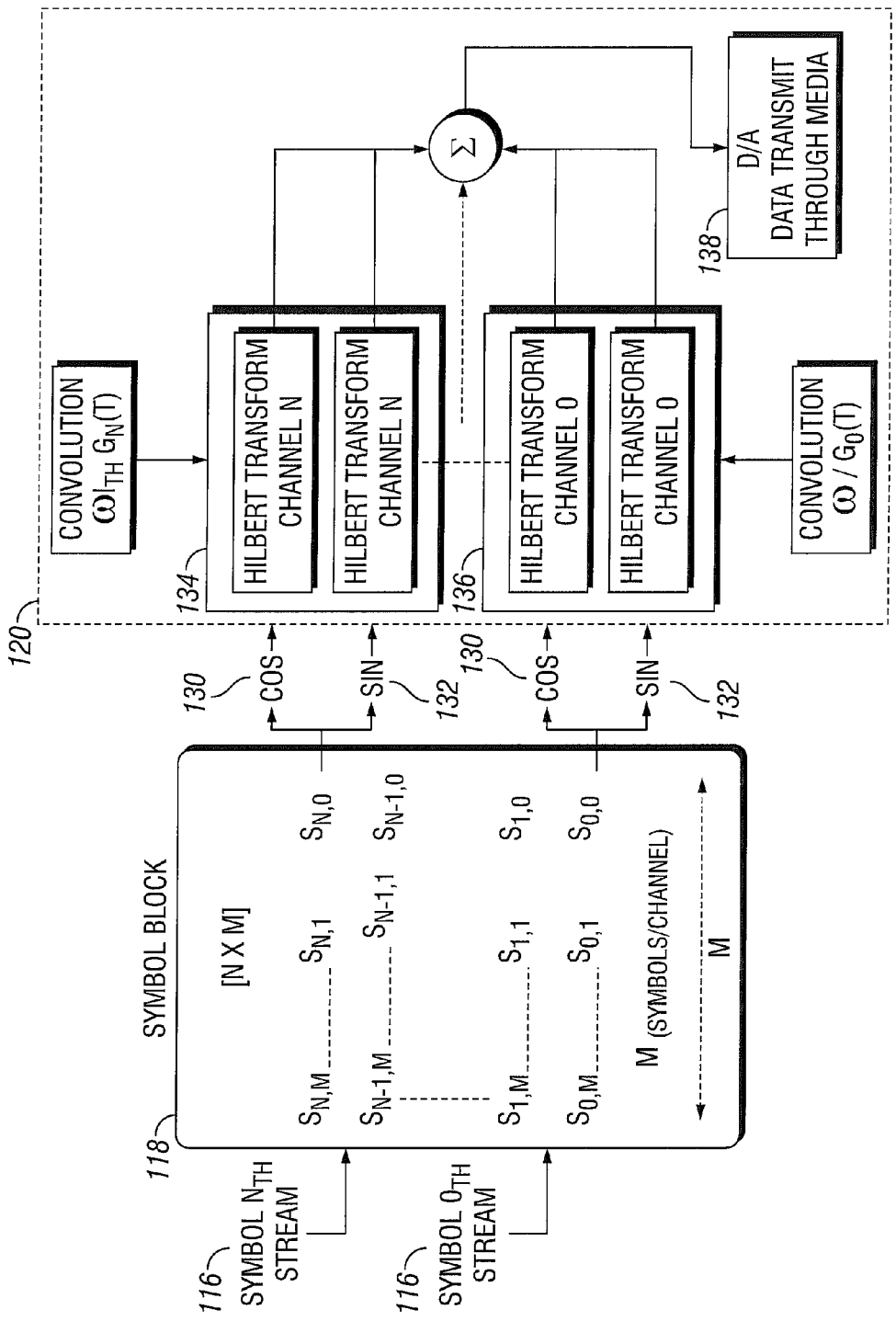
FIG. 4 is a functional block diagram illustrating the processing of an N-channel symbol stream and subsequent convolution and transformation of the symbol streams.

Turning to FIG. 4, the N streams 116 from the data block 108 (and service channels 112, 114) become N streams of symbols, each symbol corresponding to a number of bits ranging, for example but without limitation, from three to ten, based upon the channel initialization process previously described, which predetermines a maximum number of bits per symbol separately for each channel, at block 32 in FIG. 1.

With continued reference to FIG. 4, the N symbol streams collectively comprise a symbol block 118 (an N×M matrix of symbols in the illustrative embodiment) corresponding to M symbols per channel and N channels.

Each symbol in each channel symbol sequence in symbol block 118 is mapped to a two-dimensional constellation point with symbol map 119 (for example, shown in FIG. 2) comprising a unique pair of coordinates formed by an in-phase (cosine) and in-quadrature (sine or orthogonal) discrete level. Now, each symbol sequence in symbol block 118 is mapped into two sequences of pulses, one in-phase (cosine) with a clock and phase reference (reference numerals 130 in FIG. 4), and another sequence of pulses which are in-quadrature (sine) synchronized to the same clock and phase reference (reference numerals 132 in FIG. 4).

In a preferred embodiment, the two sequences 130, 132 of pulses with amplitude and phase modulation information are subjected to one or more signal processing steps, such as pulse shaping (reference numeral 124 in FIG. 2), digital-to-analog conversion (DAC) (reference numeral 126 in FIG. 2), and band pass filtering (reference numeral 128 in FIG. 2).

Once this preparation is performed, each sequence is modulated using Hilbert transforms (represented by blocks 134 and 136 in FIG. 4), or equivalent transforms or approximations in the frequency or time domain which have the objective of suppressing or reducing the carrier. Those of ordinary skill will be familiar with various modulation schemes or methodologies for performing these transforms. Among the modulation schemes appropriate for the purposes of the present invention are dual side band with reduced carrier, dual side band with suppressed carrier, single side band (upper or lower), vestigial side band, to name a few without limitation.

In the processing of signals time and memory sizes available are limited, filter series are of limited length, digital word size (number of bits) representing a signal's discrete samples are of limited length. Given these limitations suppressed should mean less than 1% (or a sufficiently small percentage by design), carrier reduction could be 5%, 10%, 20% or even 50% by design.

The Hilbert transform, its equivalent transform or approximations thereof allow the manipulation of the sign change in the lower part of the spectrum without any amplitude or phase distortion.

Thereafter, each channel is transmitted (block 138, FIG. 4) through a frequency bandwidth assigned within the media frequency transmission spectrum (i.e., the individual range of frequencies for each channel as constrained by the overall available frequency spectrum of the media used to transmit signals from downhole to the surface).

In one embodiment, the channel frequency allocation is given by a square root raised cosine filter pair for at least one data channel, m. Each data channel so allocated occupies a frequency range proportionate to:

$$-(1+\alpha_m)/2T_m \text{ to } +(1+\alpha_m)/2T_m \qquad (1)$$

where m is the data channel, $T_m$ is the baud interval for that channel, and $\alpha_m$ is the excess bandwidth for that channel, typically selectable in the range from zero to one.

Figure 5:
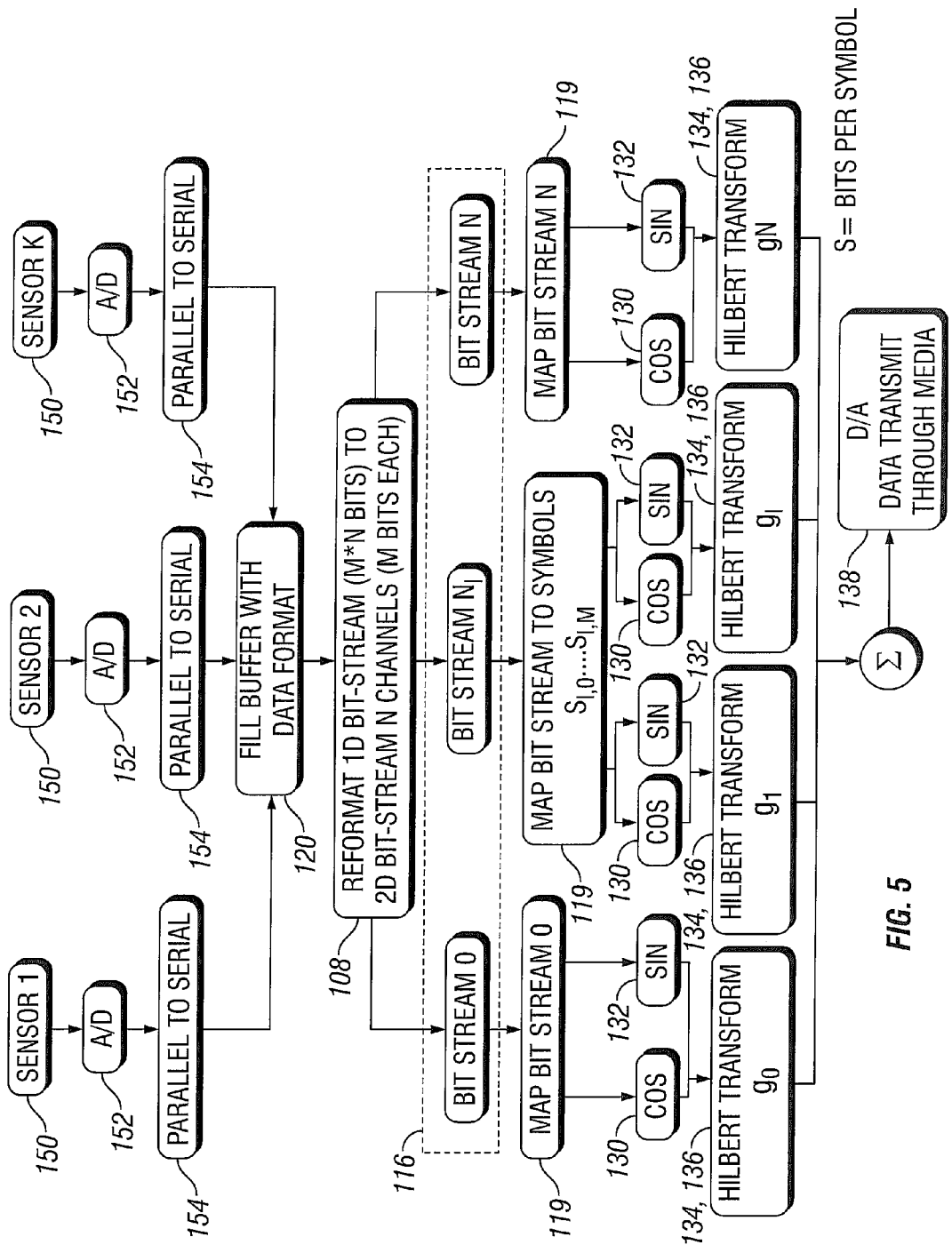
FIG. 5 is a high-level functional block diagram of the processing flow for formation sensor to media transmission in accordance with one embodiment of the invention.

A presently preferred embodiment of the invention is represented in general terms by the functional block diagram of FIG. 5, wherein it is to be understood that components and features of the invention from other drawings herein will have identical reference numerals throughout.

In particular, FIG. 5 shows a plurality of individual sensors 1, 2, . . . K, each functionally coupled to a corresponding/respective analog-to-digital converter 152 and thence to a parallel-to-serial converter 154.

Each parallel-to-serial converter 154 loads its contents as a one-dimensional bit stream into buffer 102, previously described above with reference to FIG. 3. From buffer 102, the data is reformatted into a two-dimensional bit matrix 108 having dimensions N×M, where N is the number of channels available and M is the number of bits per channel. (The two dimensional bit matrix 108 was also previously described with reference to FIG. 3.)

Consequently, bit matrix 108 is capable of outputting N individual streams of M bits each, which with the inclusion of two service channel bit streams 112 and 114 is collectively identified with reference numeral 116 in FIG. 5, just as it is in FIG. 3.

Each bit stream 116 is subsequently mapped to a two-dimensional constellation point being assigned a unique pair of coordinates formed by an in-phase (cosine) 130 and out-of-phase (sine) 132 level, as previously described with reference to FIG. 4.

Next, the sequences are subjected to processing (e.g., pulse shaping, white noise addition, filtering, and the like) and then modulated using a Hilbert transform (see blocks 134 and 136 in FIG. 4), designated with reference numerals 160-1, 160-I, and 160-N in FIG. 5. Those of ordinary skill will understand that transforms or approximations equivalent to or having the same objective as a Hilbert transform may be employed instead, with the objective of suppressing the carrier or reducing the carrier. Such modulation schemes include dual side-band with reduced carrier, dual side-band with suppressed carrier, single side-band (upper or lower), vestigial side-band, and so on, as would be apparent to those of ordinary skill in the art.

Referring to U.S. Pat. No. 5,504,479 to Doyle et al., disclosing a CAP method for increasing the data transmission capability of a conventional EWL cable, the Hilbert transform, its equivalent transform, or approximations allow the manipulation of the sign change of the lower part of the spectrum without any amplitude or phase distortion.

Each point in a constellation may be pre-calculated and available for each channel frequency facilitating the processing of a data stream and its constellation-mapped symbol stream which need to be added to all other channels and transmitted over the transmission medium (e.g., wireline). The symbol stream is preferably processed in the time domain through convolutions with time domain transform sequences. During the initialization, phase and amplitude corrections (described above with reference to FIGS. 3 and 6) are determined for each frequency channel, i.e., each processed symbol stream) and coordinated through the service channel, discussed above with reference to FIG. 3.

In particular, in a preferred embodiment, phase calibration is maintained by frequency locking the reception clocks to the transmission clocks through a frequency pilot channel 112 (see FIG. 3). The noise associated with each transmitted constellation point is measured by the area it statistically occupies (see dashed line 170 in FIG. 6), in the received constellation for a standard calibration bit stream of data. If the area is too large for the constellation size used (i.e., too many bits per symbol) and adjacent constellation points could overlap and cause a reception error, the number of bits per symbol is reduced until the adjacent constellation points in the receiving end are sufficiently statistically separated (standard deviation) to avoid symbol decoding errors in the reception.

Figure 7:
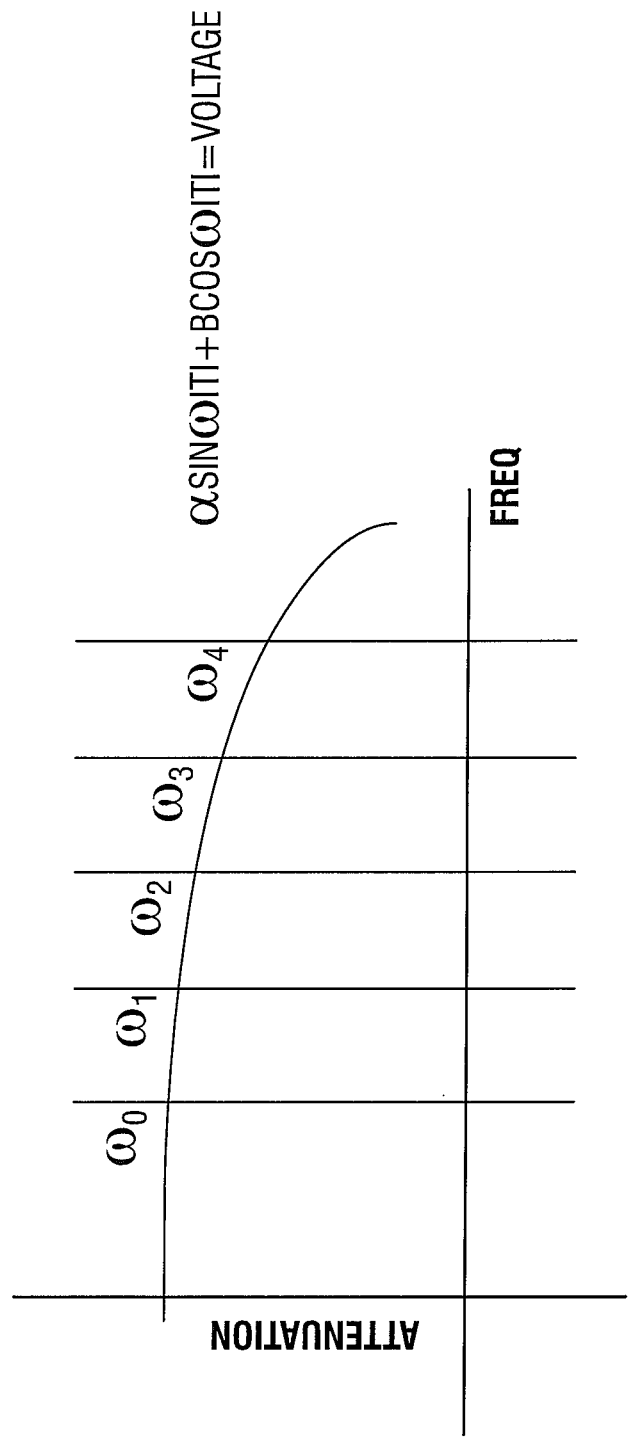
FIG. 7 is a chart showing relative change in signal-to-noise ratio to frequency.

As would be appreciated by those of ordinary skill in the art, some preemphasis may be introduced to the various symbols (e.g., via service channel 114) to compensate for media transmission distortions. As shown in FIG. 7, the signal-to-noise ratio (SNR) decreases with increasing frequency, as would be well understood by those of ordinary skill.

Figure 8:
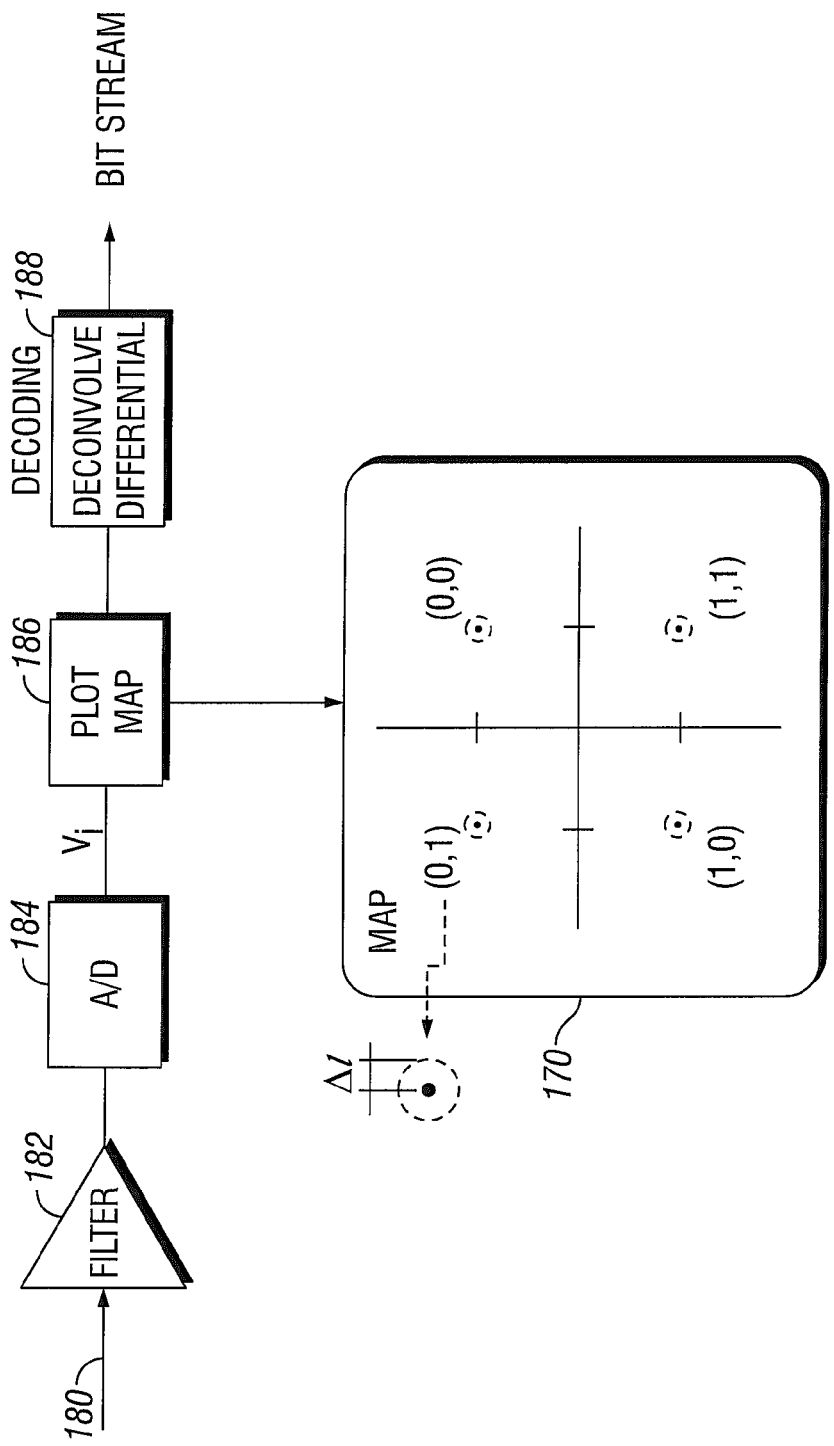
FIG. 8 is a high level schematic representation of the signal processing on the received signal for each channel.
Figure 9:
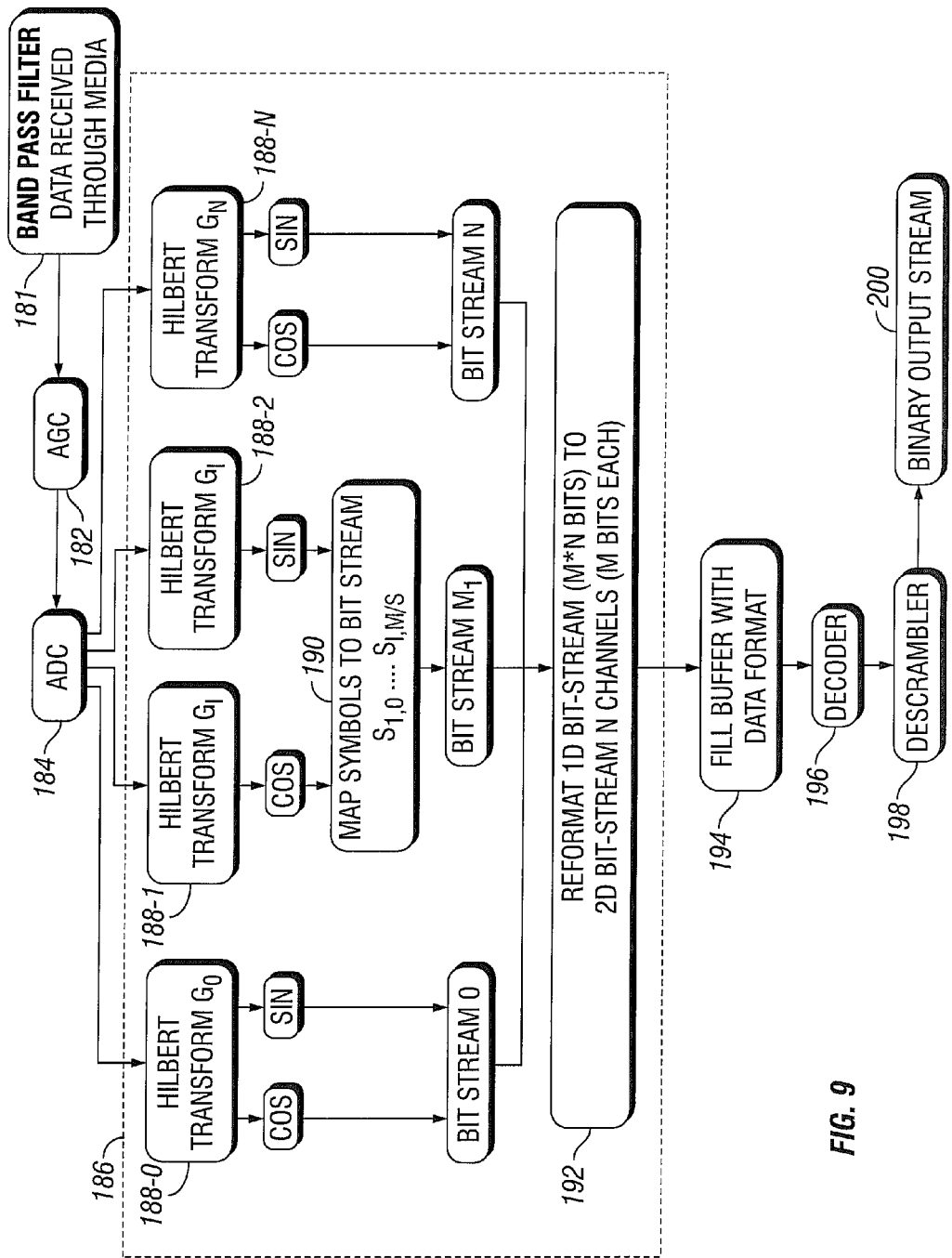
FIG. 9 is a functional block diagram of a reception channel processing sequence in accordance with one embodiment of the invention.

Turning now to FIGS. 8 and 9, the signal processing at the receiving end of the transmission medium is illustrated. FIG. 8 illustrates schematically at a high level the signal processing that takes place for each channel. As shown in FIG. 8, the received signal 180 (an analog voltage) may pass through a filter/automatic gain control (AGC) stage 182 before being applied to the input of an analog-to-digital converter (ADC) 184.

The resultant digital data is decomposed based on the predetermined constellation map 170, as represented by block 186 in FIG. 8, and then decoded (block 188 in FIG. 8 to reproduce the original bit stream 100 previously described with reference to FIG. 2.

FIG. 9 shows in somewhat more detail the decomposition step 186 from FIG. 8. With reference to FIG. 9, the decomposition stage 186 involves Hilbert transforms 188-0, 188-1, . . . , 188-N, to handle dual side-band with suppressed carrier, as well as manipulation to recover the original symbol stream (block 190 in FIG. 9) and from these, the original bit streams 0 . . . M . . . N.

The N bit streams are then assembled into a two-dimensional matrix 192 corresponding to matrix 108 described herein with reference to FIG. 3. From matrix 192, individual one-dimensional bit streams may be loaded into a buffer 194. The one-dimensional bit streams may require further decoding (block 196 in FIG. 9) and/or descrambled (block 198 in FIG. 9), ultimately producing the received binary output stream 200 corresponding (presumably) to the transmitted binary input stream 100 shown in FIG. 2.

As represented by block 188 in FIG. 8, other standard demodulation techniques can be used for the demodulation and recovering the bit stream originally sent from the transmitter end.

The data blocks and corresponding symbol blocks may be transmitted continuously or in separate blocks. Periodically, noise assessment (signal-to-noise ratio or "SNR" and corresponding bit loading per symbol), phase, amplitude and frequency calibration may take place to maintain the transmission medium's reliable operation. If one channel or group of channels are particularly noisy, for example, the bit load can be reduced to zero and the channel or channels temporarily shut down but preferably continue to transmit a predetermined test signal in order to detect at the surface when the channel is once again operable. In a further example, an error correction method is used to encode the data. The error correction method is an error correction rule, typically expressed in a program code that is used to alter or otherwise encode the data to be transmitted. For example, a Reed-Solomon error correction method is applied to the data. Reed-Solomon error correction is an error-correcting code that works by oversampling a polynomial constructed from the data. The polynomial is evaluated at several points, and these values are sent. Sampling the polynomial more often than is necessary makes the polynomial over-determined. As long as "many" of the points are received correctly, the receiver can recover the original polynomial even in the presence of a "few" bad points.

Although a specific embodiment of the invention has been described herein, it is to be understood that this has been done solely for the purposes of illustrating various features and aspects of the invention, and is not intended to be limiting with respect to the scope of the invention, as defined in the claims. It is contemplated and to be understood that various substitutions, alterations, and/or modifications, including such implementation variants and options as may have been specifically noted or suggested herein, may be made to the disclosed embodiment of the invention without departing from the spirit or scope of the invention.

What is claimed is:

1. A method of transmitting data from two or more sensors through a transmission medium in a wellbore, comprising:
   determining a bandwidth of the transmission medium;
   partitioning the bandwidth into a plurality of separate transmission channels, wherein each transmission channel is defined by an upper frequency limit and a lower frequency limit, and wherein each transmission channel extends along the length of the transmission medium;
   continuously monitoring conditions in the transmission medium;
   identifying when one of the channels experiences a reduction in operation to define a reduced operational channel; and
   reallocating data that is being transmitted across the reduced operational channel to another one of the channels.

2. The method of claim 1 wherein determining a bandwidth of the transition medium includes:
   determining the transmission characteristics of the transmission medium; and
   identifying frequencies within the bandwidth that are unsuitable for transmission.

3. The method of claim 2 wherein partitioning the bandwidth into a plurality of separate transmission channels includes avoiding frequencies within the bandwidth that are identified as unsuitable for transmission.

4. The method of claim 1, further comprising:
   determining the transmission characteristics of the transmission medium;
   determining, based on the transmission characteristics of the transmission medium, the suitability of each of the plurality of transmission channels to transmit data;
   designating each of the plurality of transmission channels as either suitable for transmission or unsuitable for transmission based on the determined suitability;
   allocating one or more of the plurality of transmission channels designated as suitable for transmission to transmit data from at least one of the two or more sensors.

5. The method of claim 4 wherein data from one of the at least two or more sensors is transmitted using a first one of the plurality of transmission channels and later, after the first one of the plurality of transmission channels is designated as unsuitable for transmission, data from the same one of the at least two or more sensors is transmitted using a second one of the plurality of transmission channels, where the second one of the plurality of transmission channels is designated as suitable for transmission.

6. The method of claim 1 wherein,
   for each of the plurality of transmission channels, the upper frequency limit is greater than the lower frequency limit; and
   the upper frequency limit and the lower frequency limit of each of the plurality of transmission channels does not overlap the upper frequency limit and the lower frequency limit of any other of the plurality of transmission channels.

7. The method of claim 1 wherein data from one of the at least two or more sensors is transmitted using at least two of the plurality of transmission channels, and wherein one of the channels uses carrierless phase/amplitude (CAP) modulation for transmission methodology.

8. The method of claim 1, wherein the step of allocating one or more of the plurality of transmission channels is based on adapting to conditions of a media through which data is transmitted.

9. The method of claim 1, wherein data from at least two of the two or more sensors is transmitted along the same channel and through a same modem.

10. The method of claim 1, wherein the transmission medium has an end at surface in communication with a surface device, and an end downhole in communication with a downhole device so that the surface and downhole devices are in direct communication.

11. The method of claim 1, wherein the transmission medium is selected from the group consisting of a wireline, a cable, fluid in the wellbore, earth surrounding the wellbore, fluid surrounding the wellbore, an optically translucent medium, and combinations thereof.

12. A system for transmitting data in a wellbore comprising:
   a surface transceiver;
   a wellbore transceiver in communication with the surface transceiver via a transmission medium; and
   control circuitry that continuously monitors conditions in the transmission medium, identifies when a channel in the transmission medium experiences a reduction in operation, and automatically reallocates data that is being transmitted between the surface and subsurface to another channel.

13. The system of claim 12, wherein the control circuitry determines a bandwidth of the transmission medium.

14. The system of claim 12, wherein the control circuitry partitions the bandwidth into a plurality of separate transmission channels, wherein each transmission channel is defined by an upper frequency limit and a lower frequency limit.

15. A method of transmitting data from two or more sensors through a transmission medium in a wellbore, comprising:
   determining a bandwidth of the transmission medium;
   partitioning the bandwidth into a plurality of separate transmission channels, each transmission channel being defined by an upper frequency limit and a lower frequency limit, and each transmission channel extending along the length of the transmission medium;
   packaging the data so that the data for each sensor is grouped together and packaged in one multi-channel data-block before being transmitted;
   continuously monitoring conditions in the transmission medium;
   identifying when one of the channels experiences a reduction in operation to define a reduced operational channel; and
   dynamically reallocating data that is being transmitted across the reduced operational channel based on the changing conditions of the transmission medium and the movement of the sensors to another one of the channels.

\* \* \* \* \*